United States Patent
Short

(10) Patent No.: US 8,313,046 B2
(45) Date of Patent: Nov. 20, 2012

(54) MULTI-POINT INJECTOR RING

(75) Inventor: John Earl Short, Norwalk, IA (US)

(73) Assignee: Delavan Inc, West Des Moines, IA (US)

( * ) Notice: Subject to any disclaimer, the term of this patent is extended or adjusted under 35 U.S.C. 154(b) by 586 days.

(21) Appl. No.: 12/535,122

(22) Filed: Aug. 4, 2009

(65) Prior Publication Data

US 2011/0031333 A1 Feb. 10, 2011

(51) Int. Cl.
*B05B 1/34* (2006.01)
(52) U.S. Cl. ........ 239/494; 239/463; 239/468; 239/472; 239/491; 239/492; 239/493
(58) Field of Classification Search .................. 239/400, 239/403, 405, 406, 423, 424, 424.5, 463, 239/468, 472, 491, 492, 493, 494; 123/531; 60/739

See application file for complete search history.

(56) References Cited

U.S. PATENT DOCUMENTS

| | | | |
|---|---|---|---|
| 2,607,193 A * | 8/1952 | Berggren et al. | 60/748 |
| 3,680,793 A | 8/1972 | Tate et al. | |
| 4,598,553 A * | 7/1986 | Saito et al. | 60/733 |
| 5,713,206 A * | 2/1998 | McWhirter et al. | 60/747 |
| 6,092,363 A * | 7/2000 | Ryan | 60/39.463 |
| 6,533,954 B2 | 3/2003 | Mansour et al. | |
| 6,755,024 B1 | 6/2004 | Mao et al. | |
| 7,520,134 B2 * | 4/2009 | Durbin et al. | 60/742 |
| 2006/0218925 A1 * | 10/2006 | Prociw et al. | 60/739 |

FOREIGN PATENT DOCUMENTS

EP 1193450 A1 4/2002

* cited by examiner

*Primary Examiner* — Len Tran
*Assistant Examiner* — Ryan Reis
(74) *Attorney, Agent, or Firm* — Edwards Wildman Palmer LLP; Scott D. Wofsy; Joshua L. Jones

(57) ABSTRACT

A multi-point injector includes an annular body defining an interior annular flow passage. The annular body includes a fluid inlet and a plurality of circumferentially spaced apart fluid outlets in fluid communication with the interior flow passage. Each of the outlets has a swirl chamber formed within the annular body associated therewith for imparting swirl to fluid delivered thereto.

20 Claims, 12 Drawing Sheets

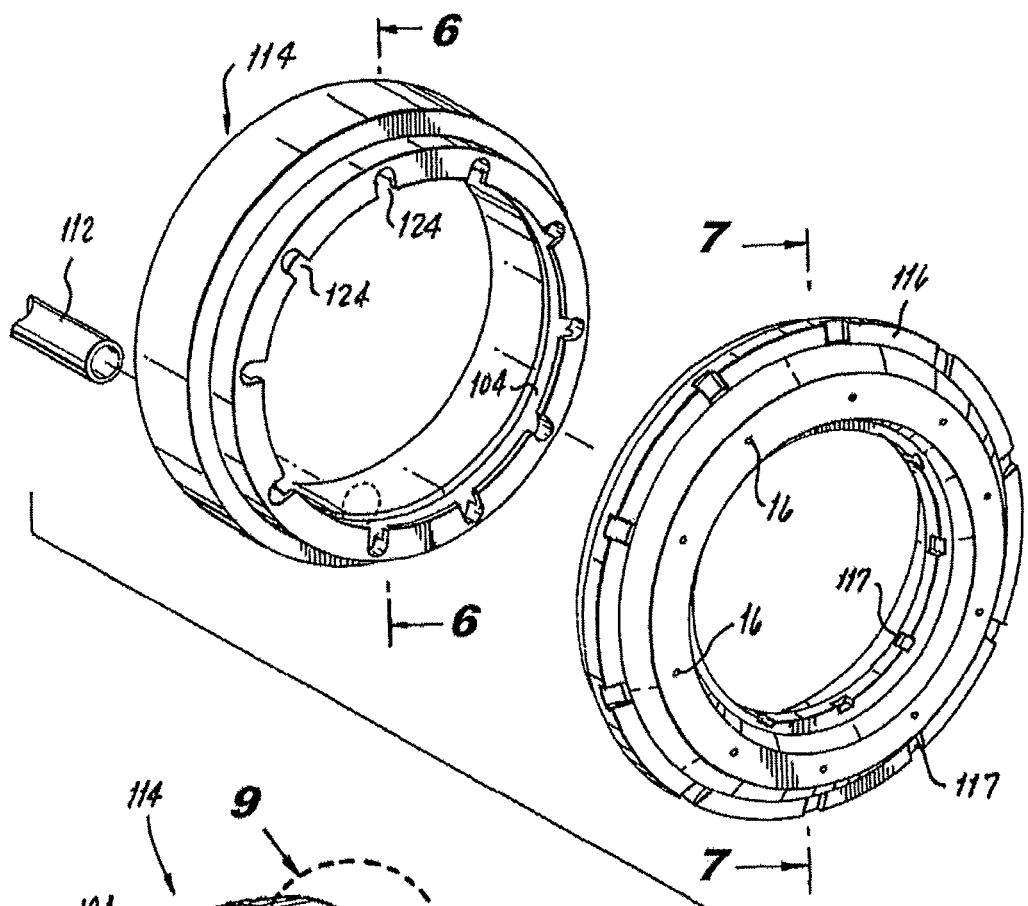
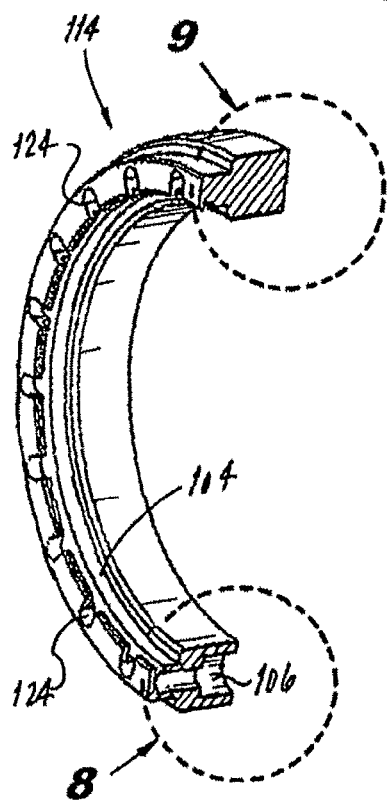
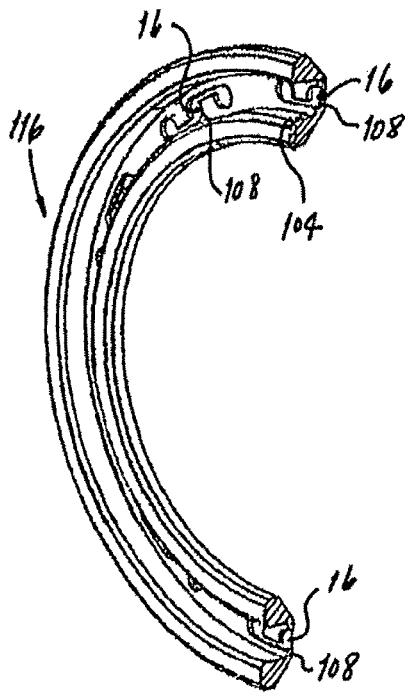
Fig. 5
Fig. 6
Fig. 7

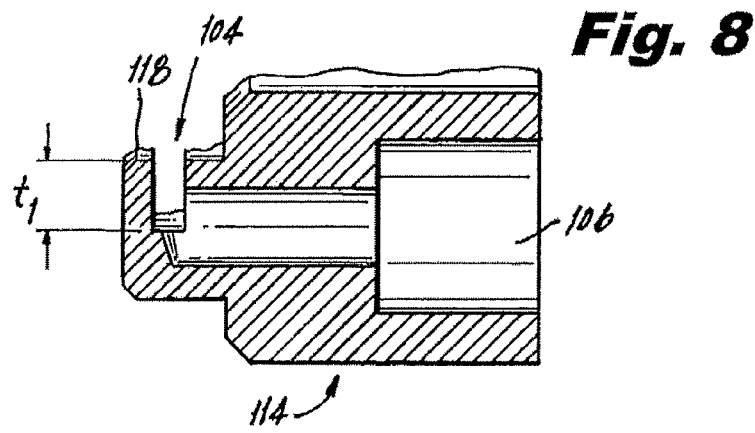
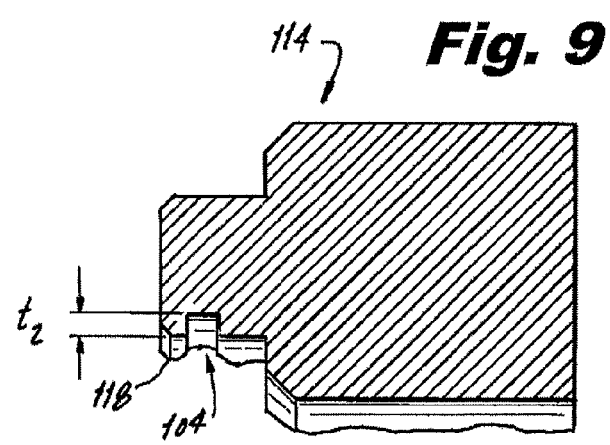
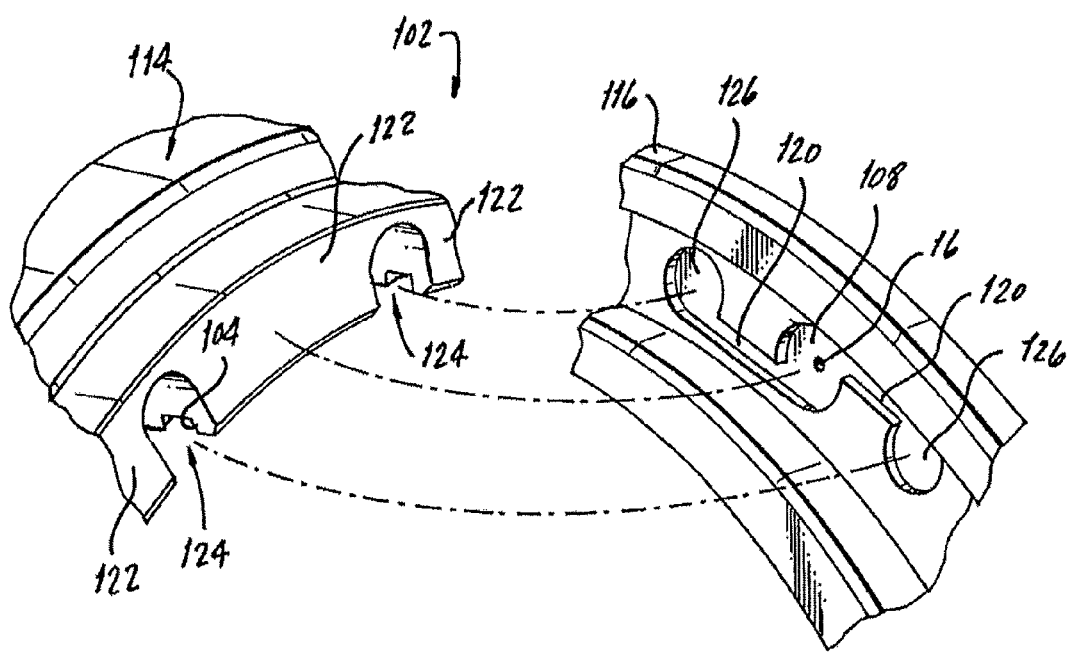

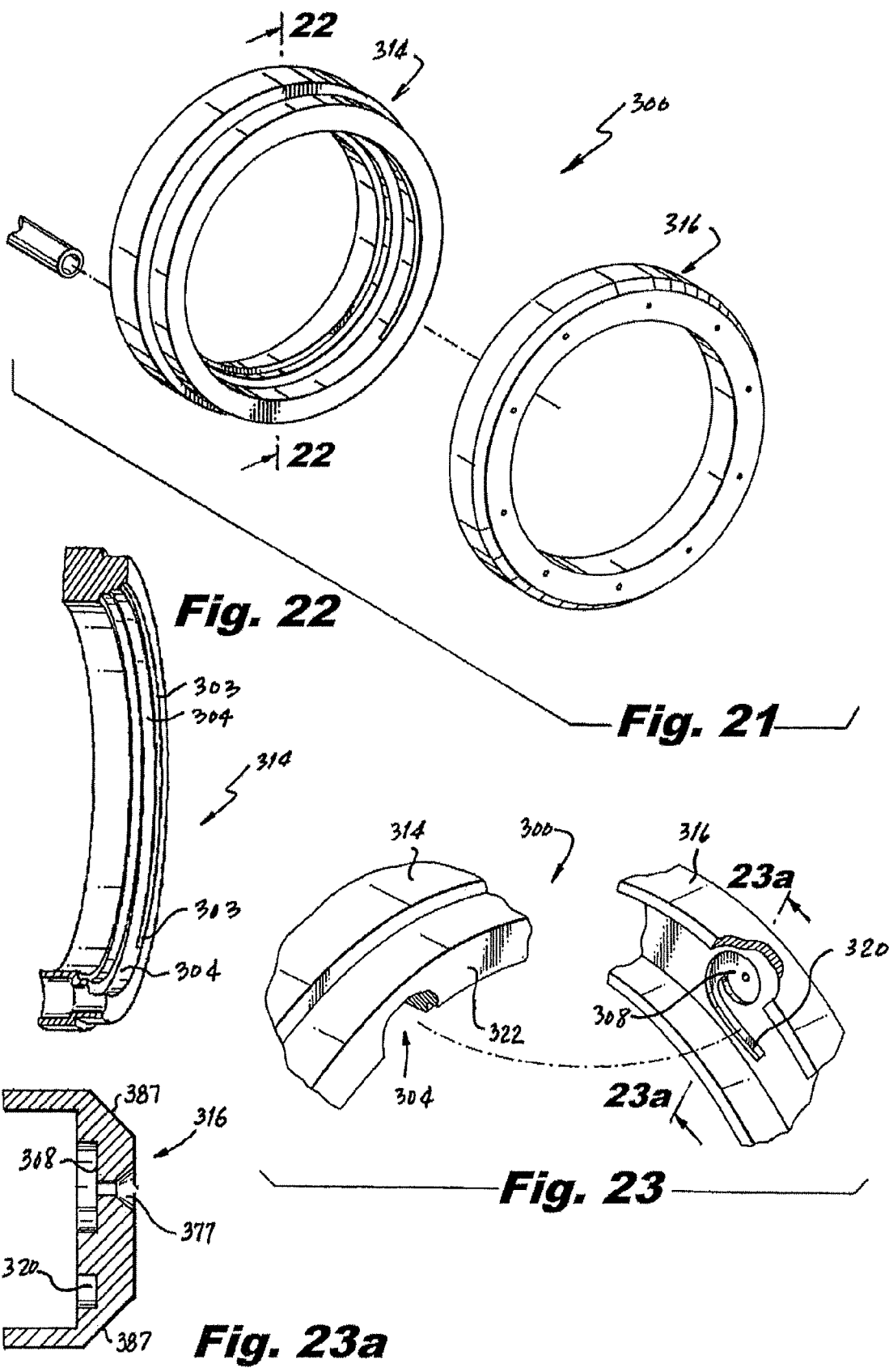

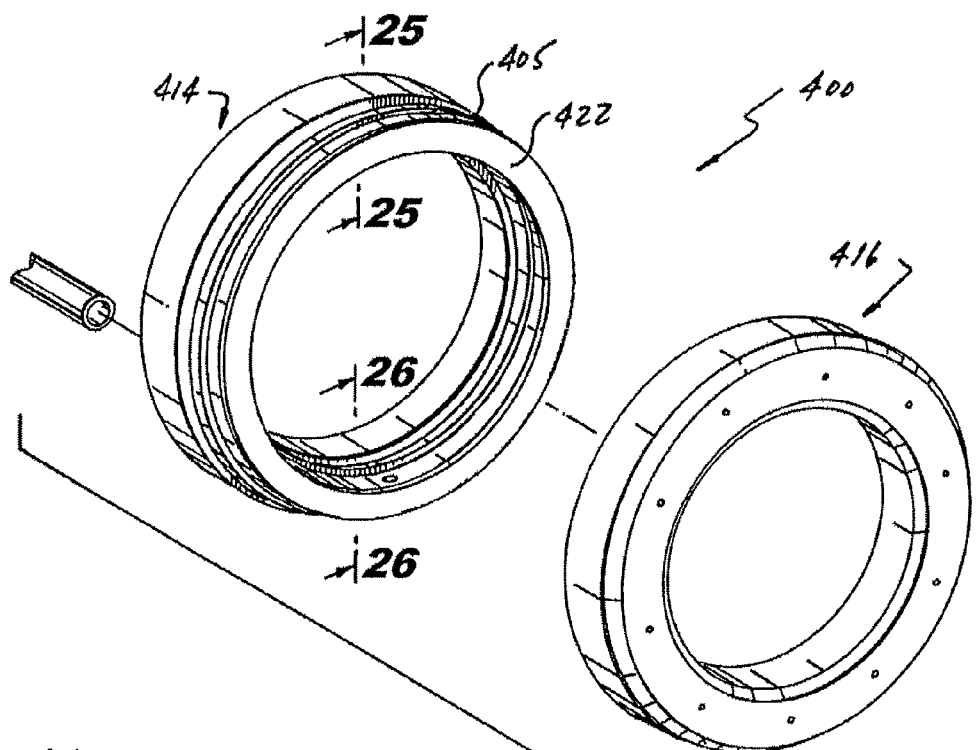
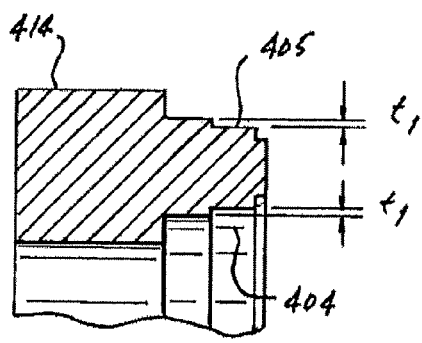
Fig. 24
Fig. 25
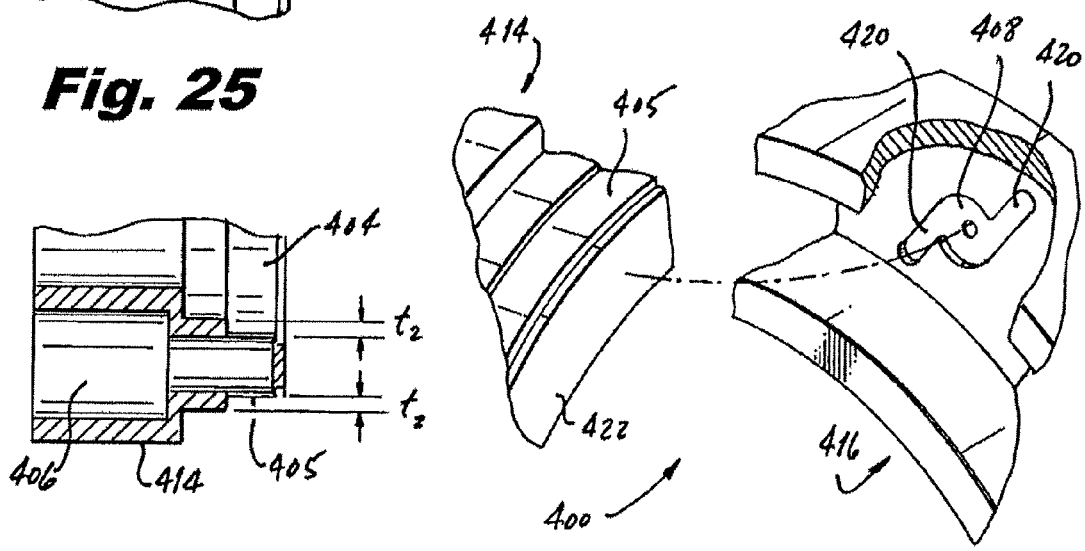
Fig. 26
Fig. 27

| Injector Configuration | Fuel Pressure PSIG | Flowrate PPH | Test Location Inches | Droplet SMD (mm) |
|---|---|---|---|---|
| Oil Heat | 50 | 72.0 | 2.0 | 112.5 |
| Multi-Point | 50 | 71.4 | 2.0 | 67.0 |
| Oil Heat | 85.2 | 93.0 | 2.0 | 89.1 |
| Multi-Point | 85.2 | 93.0 | 2.0 | 59.3 |
| Oil Heat | 175 | 132.3 | 2.0 | 65.1 |
| Multi-Point | 175 | 133.5 | 2.0 | 48.9 |

Droplet size of Single Orifice versus Multi-Point

*Fig. 28*

MULTI-POINT INJECTOR RING

BACKGROUND OF THE INVENTION

1. Field of the Invention

The present invention relates to injectors and nozzles, and more particularly to injectors and nozzles for atomizing liquids.

2. Description of Related Art

Enabling the breakup of large liquid bulk flow into finely atomized droplets has always been a challenge, particularly in fuel injection applications. For simplex pressure atomizers, in order to obtain high flow rates, the liquid supply pressure must increase dramatically, or the orifice must be enlarged. Often high pressure is not feasible, and droplets get larger as the orifice diameter increases. Air assist or prefilming airblast nozzles are commonly used to atomize sprays when pressurized air is available. The air-blast method relies on the shearing effect of high velocity air to provide atomization. Often, an upstream trim orifice is incorporated which aids in flow calibration. The pressure drop taken across the trim orifice wastes energy which could potentially be used for atomization.

In some cases, multiple injection points have been employed to disperse a flow, reducing each stream to a more manageable volume. However, there tend to be downsides to conventional multiple injection techniques, such as complex geometry, large part count, limited physical space, maintaining balanced flow rate at all injection points, poor downstream patternation, small passage sizes prone to plugging, external carbon build up due to wetted surfaces, and difficult heat shielding configurations.

In some known applications of multiple injection point injectors, jets of fuel are injected radially into a flowing air stream, relying on the air flow to break up the fuel stream. An example of this configuration is shown and described in European Patent Application No. EP 1 193 450. In this example, no swirl is imparted to the spray, which reduces design complexity, but causes fuel to emerge from the spray orifices as a straight jet, limiting atomization.

Another conventional type of injector with multiple injection points is fabricated by etching passageways into metal sheets and then bonding the sheets together, forming a laminated assembly. An example of this configuration is shown and described in U.S. Pat. No. 6,533,954. In this example, swirling air is introduced radially around each injection point, through slots in the laminated sheets. An inherent problem with this type of construction is the difficulty in heat shielding the fuel when the air is hot, as it is in most combustion and fuel processing applications, since the passageways for both air and fuel are formed from common sheets of metal creating high heat transfer rates between the hot air and colder fuel.

Another method of multiple point injection is to mount individual spray tips on stems attached to a manifold. An example of this type of configuration is shown in U.S. Pat. No. 6,755,024. In this example, each spray tip includes an air swirler to aid in atomizing fuel exiting the discharge orifice thereof.

Such conventional methods and systems generally have been considered satisfactory for their intended purpose. However, there still remains a continued need in the art for multi-point injectors that allow for effective atomization with simplified geometry, improved piece count and physical space requirements. There also remains a need for multi-point injectors that provide improved balance of flow rate, improved downstream patternation, simplified heat shielding capabilities, reduced plugging and reduced external carbon build up. The present invention provides a solution to these problems.

SUMMARY OF THE INVENTION

The subject invention is directed to a new and useful multi-point injector. The multi-point injector includes an annular body defining an interior annular flow passage. The annular body includes a fluid inlet and a plurality of circumferentially spaced apart fluid outlets in fluid communication with the interior flow passage. Each of the outlets has a swirl chamber formed within the annular body associated therewith for imparting swirl to fluid delivered thereto.

In accordance with one aspect of the invention, the interior flow passage can be eccentric with respect to a central axis of the annular body to provide a substantially uniform fluid pressure to each of the outlets. The multi-point injector can further include an inlet tube operably connected to the fluid inlet of the annular body for supplying fluid to the interior flow passage. At least one second fluid inlet can be defined in the annular body in fluid communication with the flow passage. Each swirl chamber can be a spiral shaped swirl chamber.

In certain embodiments, the annular body includes a distributor ring with the fluid inlet of the annular body defined therein, wherein the annular body includes an orifice ring connected to the distributor ring with the outlets of the annular body defined therein. The interior flow passage is defined between the distributor ring and the orifice ring. Each swirl chamber of the annular body can be defined in the orifice ring about one of the fluid outlets. Each swirl chamber can also include a tangential inlet slot configured to convey fluid from the interior flow passage to the swirl chamber. A swirl chamber slot backing surface can be defined on the distributor ring adjacent each swirl chamber and a plurality of fluid delivery slots can be defined in the swirl chamber slot backing surface to provide passage for fluids from the interior flow passage into the tangential inlet slots of the swirl chambers.

In accordance with certain embodiments, two tangential inlets in are in fluid communication with each swirl chamber and are configured to convey fluid from the flow passage to the swirl chamber in a common swirl direction. One swirl chamber and two respective tangential inlets are defined in the orifice ring about each outlet for imparting swirl to fluids exiting the outlet. The swirl chambers and tangential inlets can be configured to impart co-rotating swirl to flow from the outlets. It is also contemplated that the swirl chambers and tangential inlets can be configured to impart counter-rotating swirl to flow from the outlets.

The invention also provides a multi-point injector with inner and outer annular flow passages. The multi-point injector includes a distributor ring defining a central axis and having a fluid inlet. An orifice ring is connected to the distributor ring. The orifice ring defines a plurality of outlets circumferentially spaced apart with respect to the axis. The outer annular flow passage is defined between the distributor ring and the orifice ring around the axis. The outer flow passage is configured to provide for fluid communication between the fluid inlet and the outlets for supplying fluid to be sprayed from the outlets. The inner annular flow passage is defined between the distributor ring and the orifice ring around the axis inboard of the outer flow passage. The inner flow passage is configured to provide fluid communication between the fluid inlet and the outlets for supplying fluid to be sprayed from the outlets.

A portion of the outer flow passage can be defined in the distributor ring eccentric with respect to the axis, and a portion of the inner flow passage can be defined in the distributor ring eccentric with respect to the axis. A plurality of swirl chambers can be defined in the orifice ring, wherein one swirl chamber is defined about each outlet for imparting swirl to fluids exiting the outlet. Each of the swirl chambers can include an outer tangential inlet slot configured to convey fluid from the outer flow passage to the swirl chamber. Each of the swirl chambers can also include an inner tangential slot configured to convey fluid from the inner flow passage to the swirl chamber. The multi-point injector can further include an inlet tube operably connected to the fluid inlet of the distributor ring for supplying fluid to the flow passages.

The invention also provides an injector. The injector includes a nozzle body defining a central axis. A distributor ring is provided within the nozzle body disposed around the axis thereof and having a fluid inlet. An orifice ring is connected to the distributor ring. The orifice ring has a plurality of outlets circumferentially spaced apart with respect to the axis. An interior annular flow passage is defined between the distributor ring and the orifice ring. The flow passage defines a portion of a first spray circuit and is configured to provide fluid communication between the fluid inlet and the outlets for supplying fluid to be sprayed from the outlets. A heat shield is operably connected to the nozzle body and is configured to thermally isolate fluids in the flow passage. The injector can further include a second spray circuit including an outlet inboard of the outlets of the orifice ring.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 5 is an exploded perspective view of the ring components of the multi-point injector of FIG. 4, showing the internal features of the distributor ring;

FIG. 6 is cross-sectional perspective view of the distributor ring of FIG. 5, showing the cross-sections of the distributor ring at the inlet and a position opposite the inlet;

FIG. 7 is a cross-sectional perspective view of the orifice ring of the multi-point injector of FIG. 5, showing the internal features of the orifice ring;

FIG. 8 is a cross-sectional side elevation view of a portion of the distributor ring of FIG. 6, showing the cross-section of the distributor ring at the inlet;

FIG. 9 is a cross-sectional side elevation view of a portion of the distributor ring of FIG. 6, showing the cross-section of the distributor ring at a position opposite the inlet;

FIG. 10 is an exploded perspective view of portions of the multi-point injector of FIG. 4, showing how the internal features of the distributor ring align with the internal features of the orifice ring;

FIG. 21 is an exploded view of another exemplary embodiment of a multi-point injector constructed in accordance with the present invention, showing the internal features of the distributor ring;

FIG. 22 is a cross-sectional perspective view of the distributor ring of the multi-point injector of FIG. 21, showing the cross-sections of the distributor ring at the inlet and a position opposite the inlet;

FIG. 23 is an exploded perspective view of portions of the multi-point injector of FIG. 21, showing the internal features of the distributor ring partially cut way, the internal features of the orifice ring, and the alignment of the internal features of both rings when the rings are brought together;

FIG. 23a is a cross-sectional side elevation view of a portion of the orifice ring of FIG. 21, showing the exit cone of one of the outlets;

FIG. 24 is an exploded view of another exemplary embodiment of a multi-point injector constructed in accordance with the present invention, showing the internal features of the distributor ring;

FIG. 25 is a cross-sectional perspective view of the distributor ring of the multi-point injector of FIG. 24, showing the cross-section of the distributor ring at a point opposite the inlet;

FIG. 26 is a cross-sectional perspective view of the distributor ring of the multi-point injector of FIG. 24, showing the cross-section of the distributor ring at the inlet;

FIG. 27 is an exploded perspective view of portions of the multi-point injector of FIG. 24, showing the internal features of the distributor ring, the internal features of the orifice ring, and the alignment of the internal features of both rings when the rings are brought together; and FIG. 28 is a table comparing droplet sizes produced in a single orifice injector and in a multi-point injector constructed in accordance with the present invention, tested over various fuel pressures.

DETAILED DESCRIPTION OF THE PREFERRED EMBODIMENTS

Figure 1:
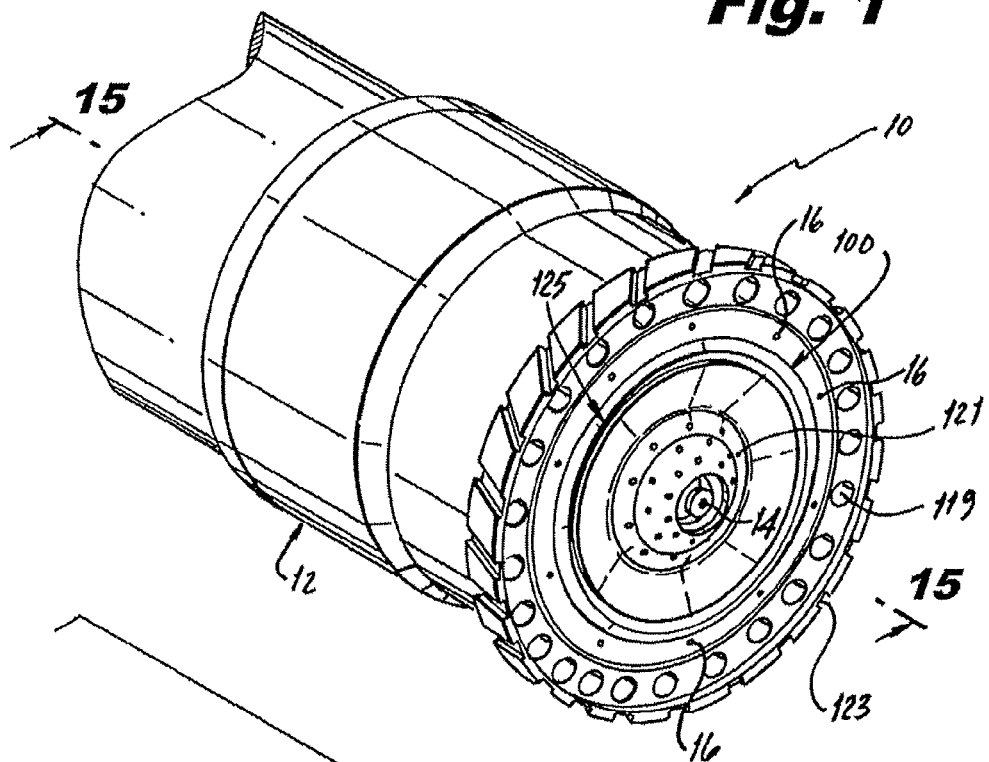
FIG. 1 is a perspective view of a portion of an injector constructed in accordance with the present invention, showing the outlets of a multi-point injector of one fluid circuit and the single outlet of central fluid circuit.

Reference will now be made to the drawings wherein like reference numerals identify similar structural features or aspects of the subject invention. For purposes of explanation and illustration, and not limitation, a partial view of an exemplary embodiment of the multi-point injector in accordance with the invention is shown in FIG. 1 and is designated generally by reference character 100. Other embodiments of multi-point injectors in accordance with the invention, or aspects thereof, are provided in FIGS. 2-28, as will be described. The methods and devices of the invention can be used to provide multi-point injection for atomizing fluids, which has application to fuel injection such as in gas turbine engines, humidification, atomizing fluids for fuel cells, or any application that would benefit from fine droplet sizes and uniform distribution.

Figure 2:
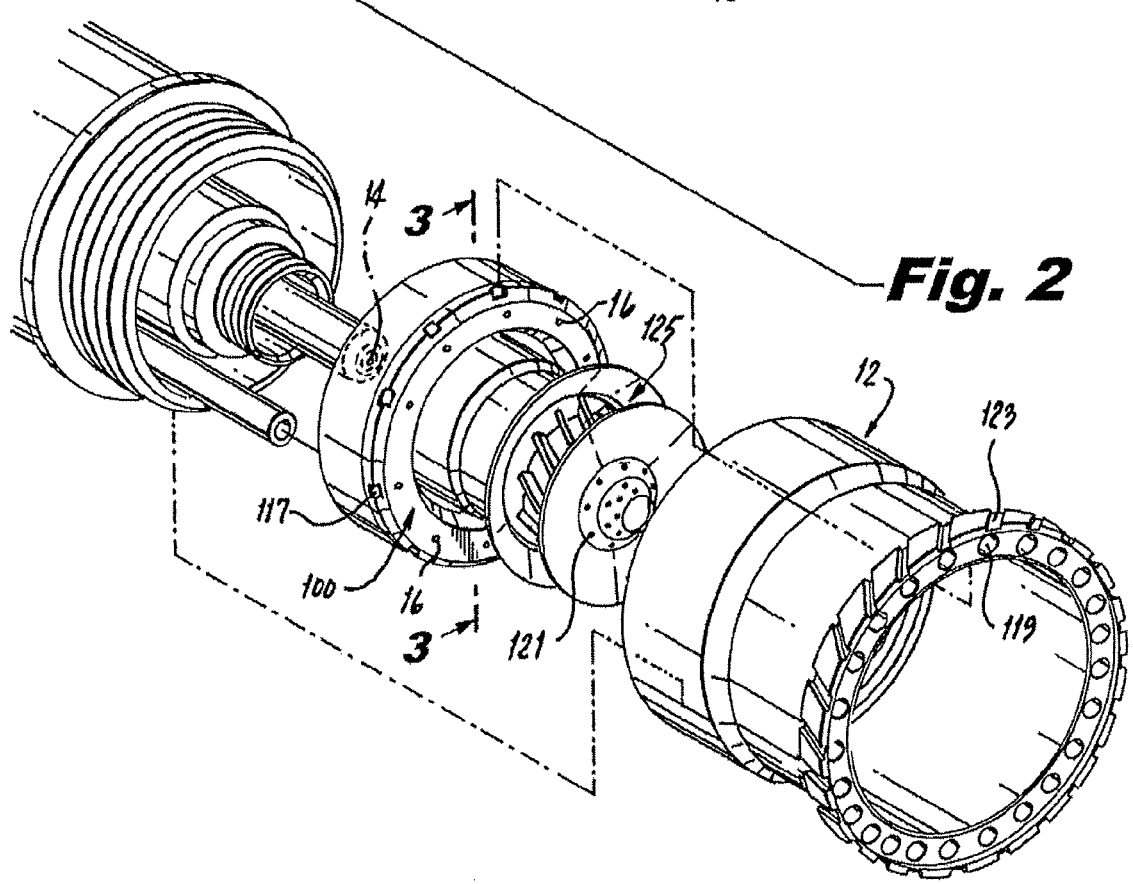
FIG. 2 is an exploded perspective view of the injector of FIG. 1, showing the multi-point injector within heat shielding.

FIG. 1 shows an injector 10 constructed in accordance with the present invention. Injector 10 includes a nozzle body 12 housing two fluid circuits. The first fluid circuit has a spray orifice 14 on the centerline of nozzle body 12. The second circuit has ten spray orifices or outlets 16, which serve as metering orifices, spaced apart radially from central spay orifice 14. FIG. 2 shows an exploded view of injector 10 to show multi-point injector 100, which includes the multiple spray outlets 16.

Figure 3:
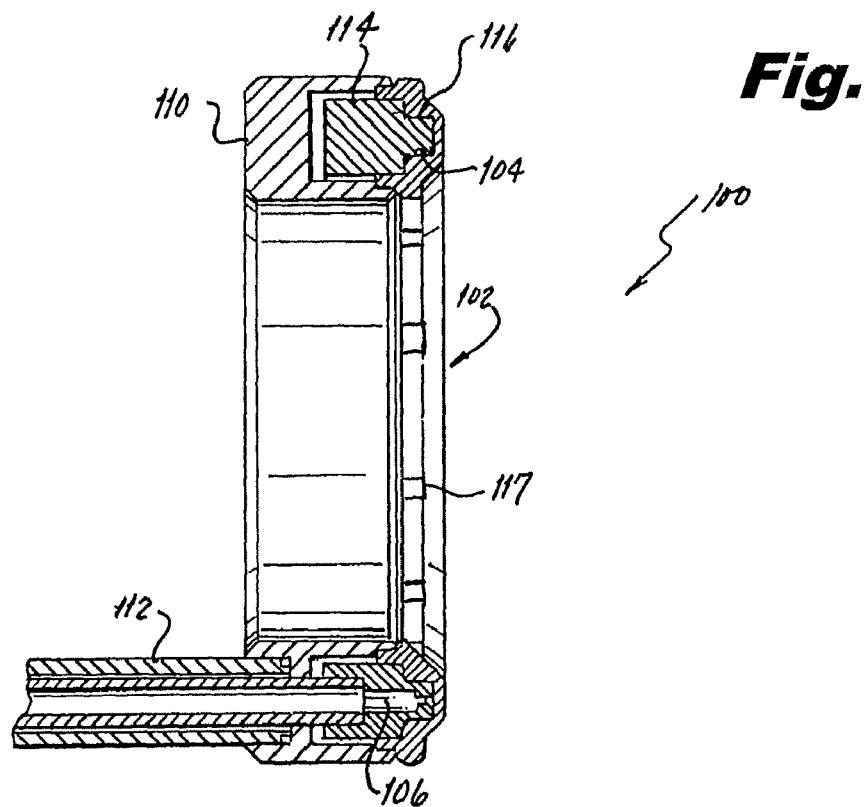
FIG. 3 is a cross-sectional side-elevation view of the multi-point injector of FIG. 2, showing the ring components and heat shielding.
Figure 4:
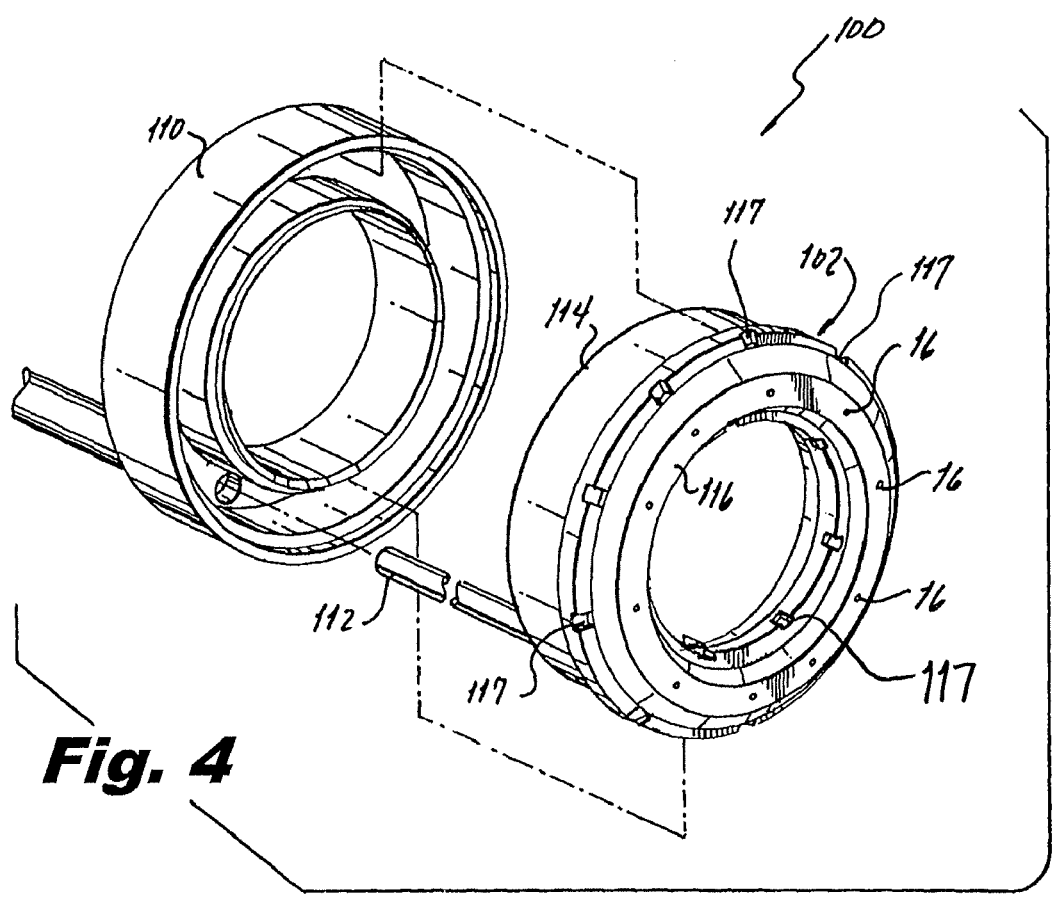
FIG. 4 is a partially exploded perspective view of the multi-point injector of FIG. 3, showing the ring components removed from the heat shielding.

Referring now to FIG. 3, multi-point injector 100 includes an annular body 102 defining an interior annular flow passage 104. Annular body 102 includes a distributor ring 114 and an orifice ring 116 that are joined to form flow passage 104 therebetween. Annular body 102 includes a fluid inlet 106 which is in fluid communication with flow passage 104. FIG. 4 shows annular body 102 with heat shield 110 removed. Heat shield 110 provides a thermally insulative gap between heat shield 110 and annular body 102 for shielding the wetted walls of flow passage 104 from high temperatures external to multi-point injector 100. Shielded conduit 112 is a tube that fluidly connects fluid inlet 106 to supply fluid to flow passage 104. A flow of steam or other gas can also be provided through slots 117 to sweep the conical faces of multi-point injector 100 in order to reduce or prevent carbon built-up that often forms in areas of stagnant flow when using hydrocarbon fuels, for example.

Referring now to FIG. 4, the plurality of circumferentially spaced apart fluid outlets 16 are defined in orifice ring 116 and are in fluid communication with flow passage 104. FIG. 5 shows distributor ring 114 separated from orifice ring 116. The portion of flow passage 104 that is defined in distributor ring 114 is indicated in FIG. 5, however it is to be understood that flow passage 104 is fully defined when distributor ring 114 is joined to orifice ring 116. FIGS. 6 and 7 show distributor ring 114 and orifice ring 116, respectively, in cross-sectional perspective to show cross-sectional profiles of each ring at inlet 106 and at a point opposite inlet 106, i.e. 180° around the ring from inlet 106. The respective portions of flow passage 104 are indicated on both rings in FIGS. 6 and 7.

As shown in FIG. 7, each of the outlets 16 has a swirl chamber 108 formed within an interior portion of orifice ring 116. Each swirl chamber 108 has an outlet 16 associated therewith to impart swirl to fluid issuing through the respective outlet 16. FIGS. 8 and 9 show the cross-sections indicated in FIG. 6 in greater detail to show that flow passage 104 is eccentric with respect to the center axis of multi-point injector 100. Flow passage 104 is formed relatively deeply near inlet 106, as shown in FIG. 8, and is more shallow at a point opposite inlet 106, as shown in FIG. 9. This variation in depth can be appreciated by comparing the depth of flow passage 104 to lip 118 in cross-section in FIGS. 8 and 9, i.e. thickness $t_1$ of flow passage 104 in FIG. 8 is greater than thickness $t_2$ of flow passage 104 in FIG. 9.

The eccentric configuration of flow passage 104, narrowing in area as it goes away from inlet 106 helps ensure that the fluid pressure supplied to each of the swirl chambers 108 and outlets 16 is substantially uniform, which provides for even spray distribution across all of outlets 16. Without this eccentricity, there would be a pressure drop at each outlet as flow is diverted out at each injection point. Mass flow is directly proportional to pressure, and since each orifice is of the same size, maintaining equal pressure at each orifice also maintains equal mass flow through all of the outlets 16.

Referring now to FIG. 10, mating portions of distributor ring 114 and orifice ring 116 of annular body 102 are shown to demonstrate the alignment of the internal components of each ring. Each swirl chamber 108 of the annular body 102 is defined in orifice ring 116 about one of the fluid outlets 16. Each swirl chamber 108 also includes tangential inlet slots 120 configured to convey fluid from flow passage 104 to swirl chamber 108. A swirl chamber slot backing surface 122 is defined on distributor ring 114 adjacent each swirl chamber 108 when the rings are joined. A Plurality of delivery slots 124 are defined in backing surface 122 to provide passage for fluids from interior flow passage 104 into swirl chamber inlets 126, through tangential inlet slots 120 and into swirl chambers 108. Orifice ring 116, distributor ring 114, and inlet conduit 112 are brazed together utilizing alignment marks to ensure proper alignment between delivery slots 124 and swirl chamber inlets 126.

Figure 11:
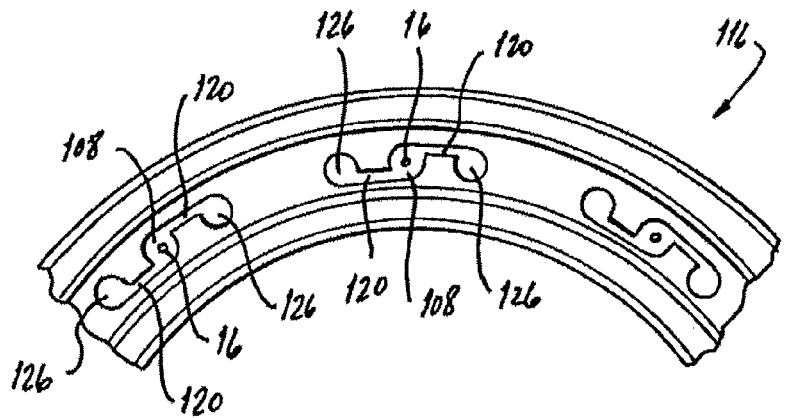
FIG. 11 is an interior elevation view of a portion of the orifice ring of FIG. 7, showing the tangential slots of the swirl chambers in a co-rotational configuration.

FIG. 11 shows two tangential inlet slots 120 that in are in fluid communication with each swirl chamber 108 and are configured to convey fluid from flow passage 104 to the respective swirl chamber 108 in a common swirl direction, for co-rotational swirl. As shown in FIG. 11, each of the tree swirl chambers 108 shown and its accompanying tangential inlet slots 120 are identical to one another. Since tangential inlet slots 120 each introduce fluid tangentially into the respective swirl chamber 108 in a counter-clockwise direction as viewed in FIG. 11, the spray issuing from outlets 16 are co-rotational, as indicated schematically by the stippled sprays 128 and large arrows in FIG. 12.

Figure 13:
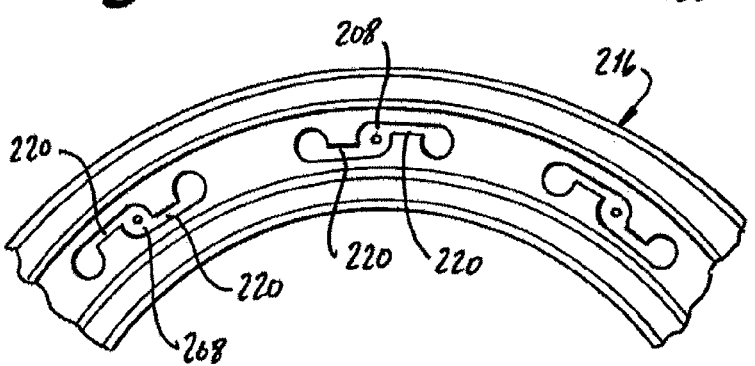
FIG. 13 is an interior elevation view of a portion of another exemplary embodiment of an orifice ring constructed in accordance with the present invention, showing the tangential slots of the swirl chambers in a counter-rotational configuration.
Figure 14:
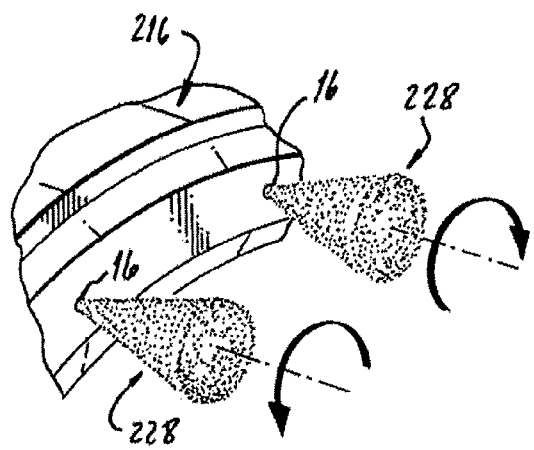
FIG. 14 is a perspective view of a multi-point injector incorporating the orifice ring of FIG. 13, schematically showing spray from two counter-rotational spray orifices.

Counter-rotational spray is also possible, as indicated in FIGS. 13 and 14. FIG. 13 shows an exemplary orifice ring 216 having counter-rotational swirl chambers 208. Swirl chambers 208 are counter-rotational because unlike swirl chambers 108 described above, chambers 208 are not all identical. Rather, every other swirl chamber 208 has clockwise-oriented tangential inlet slots 220, and every other swirl chamber 208 has counter-clockwise-oriented tangential inlet slots 220. FIG. 14 shows the resultant counter rotational sprays 228 schematically, as indicated by the large arrows.

Figure 12:
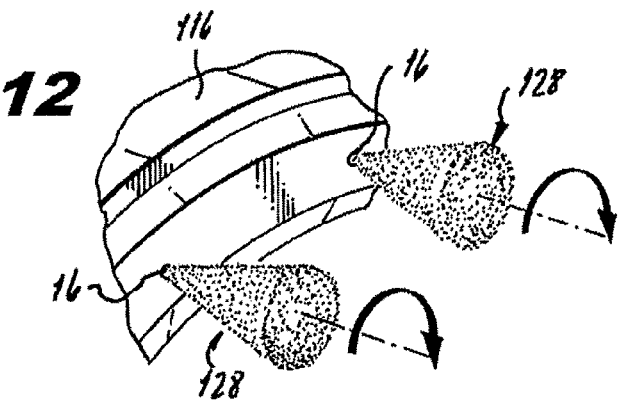
FIG. 12 is a perspective view of a portion of the multi-point injector of FIG. 4, schematically showing spray from two co-rotational spray orifices.

With continued reference to FIGS. 11-14, in the co-rotational configuration of FIGS. 11 and 12, the tangential velocity of the droplets (swirl direction) is opposite at the point where the individual spray cones begin to impinge upon one another. This causes the droplets to meet head-on. In the alternating, counter-rotational configuration shown in FIGS. 13 and 14, the tangential velocity of adjacent sprays is moving in the same direction at the interaction point. Test results indicate that co-rotational configurations have better uniformity but roughly the same droplet size when compared to counter-rotational configurations.

Figure 15:
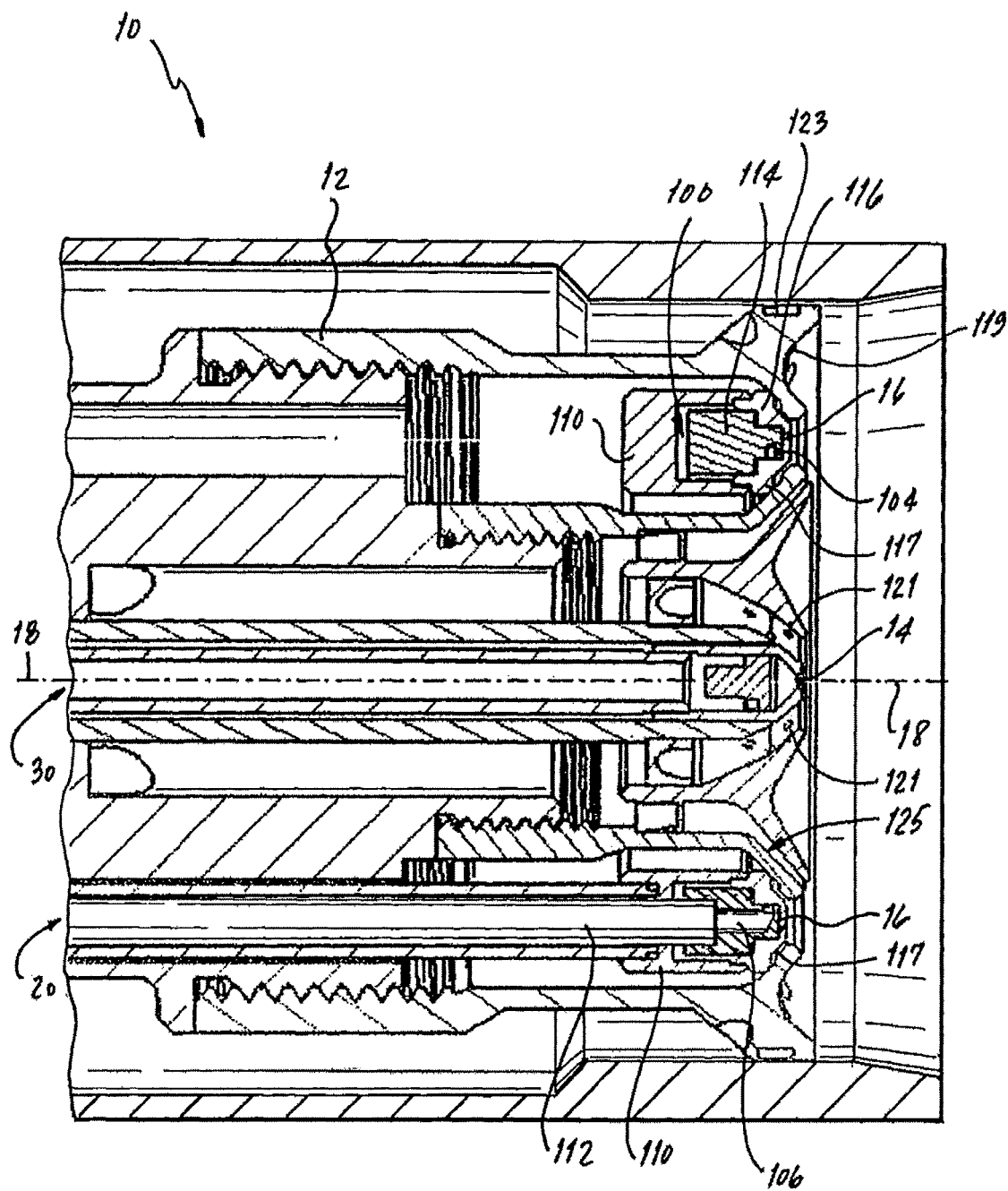
FIG. 15 is a side elevation view of the injector of FIG. 1, showing the multi-point injector ring components and heat shielding within the injector.

Referring now to FIG. 15, multi-point injector 100 is shown included as part of a multi-circuit injector 10, as described above with reference to FIG. 1. Injector 10 includes a nozzle body 12 defining a central axis 18. Distributor ring 114 is disposed around axis 18. Orifice ring 116 is connected to distributor ring 114, as described above. Outlets 16 are equally spaced out circumferentially with respect to the axis 18, however, those skilled in the art will readily appreciate that other non-equally spaced configurations can also be used without departing from the spirit and scope of the invention.

Flow passage 104 defines a portion of a first spray circuit 20 and provides fluid communication between fluid inlet 106 and outlets 16 for supplying fluid to be sprayed from outlets 16. Heat shield 110 is operably connected to nozzle body 12 and is configured to thermally isolate fluids in flow passage 104. This reduces or eliminates coking in flow passage 104. Injector 10 further includes a second spray circuit 30 including central spray orifice 14 on axis 18 inboard of outlets 16 of orifice ring 116.

The fluid circuits can be simultaneously operated to provide a high flow rate for high power operation, and one circuit can be shut off during low power operation, for example to stage operation of fuel flow in a gas turbine engine. Injectors in accordance with the present invention can also incorporate air swirlers, heat shielding, support structures, and other suitable components as needed for specific applications. Injector 10 is shown and described as having two flow circuits 20 and 30, however, those skilled in the art will readily appreciate that any suitable number of flow circuits can be included without departing from the spirit and scope of the invention.

Figure 16:
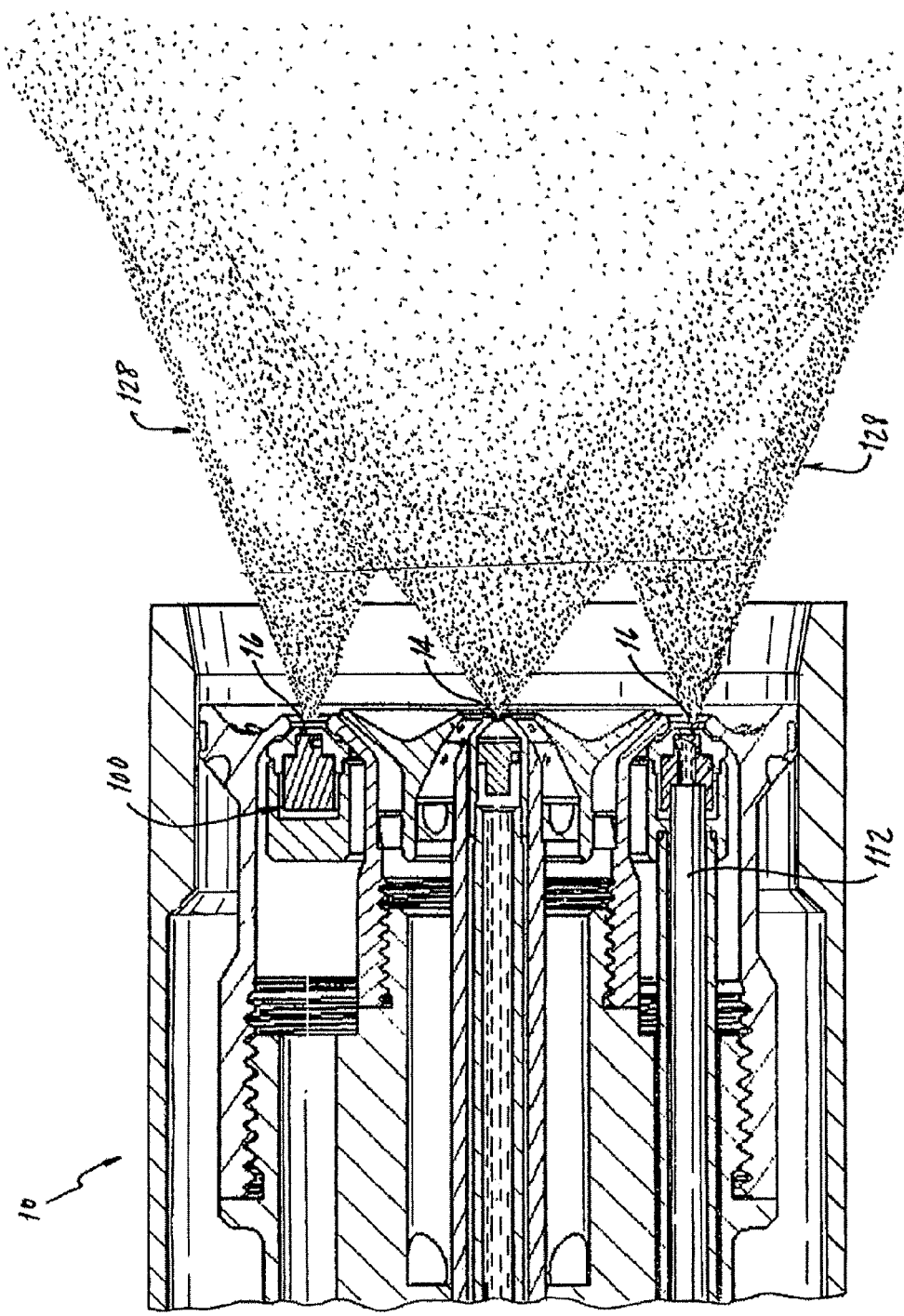
FIG. 16 is a side elevation view of the injector of FIG. 1, schematically showing spray from a central spray orifice and from two orifices of the multi-point injector.

Sprays from outlets 16 interact with spray from orifice 14 in injector 10 downstream from injector 10 to create an overall spray pattern. FIG. 16 shows injector 10 with a schematic representation of a spray pattern created by orifice 14 on the centerline and two of the outlets 16 of multi-point injector 100. This represents a spray pattern when both fuel circuits 20 and 30 are operating. In operation, all ten outlets 16 deliver a spray, however in FIG. 16 only two outlets 16 are shown spraying for purposes of clarity. Steam and/or other gas can be injected through one or more flow circuits in injector 10 and out orifices 117, 119, 121, 123 and 125 to provide additional swirl and or prevent build up of coke on susceptible surfaces (see FIGS. 1, 2, and 15).

Figure 17:
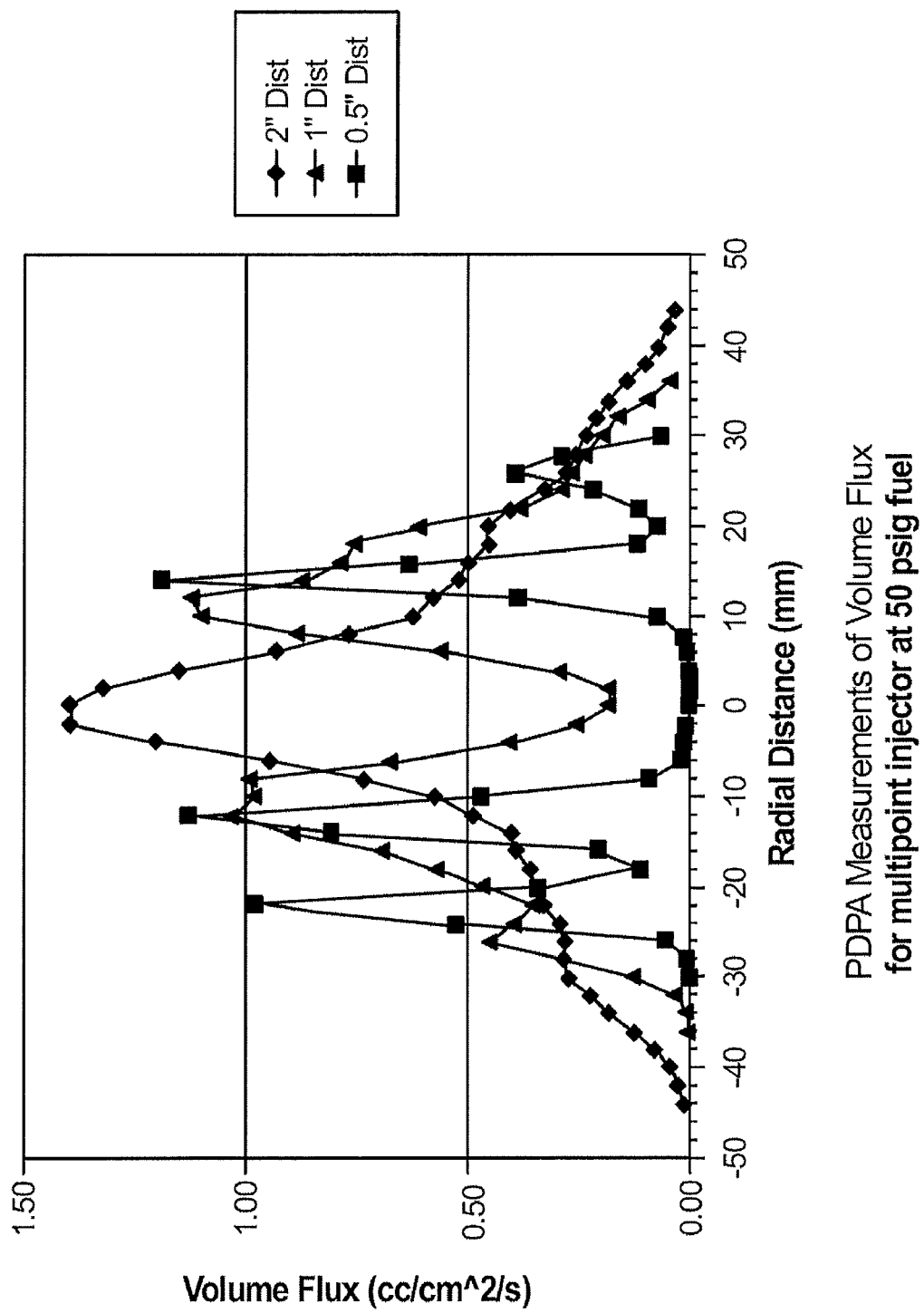
FIG. 17 is a plot of volume flux versus radial distance for spray from an exemplary embodiment of a multi-point injector constructed in accordance with the present invention, showing the volume flux profile at various distances downstream of the spray orifices.

FIG. 17 shows point-to-point PDPA measurements of volume flux at various axial downstream distances for the test rig, showing how a multi-point injector spray pattern develops. FIG. 17 includes a plot showing spray profiles as volume flux over radial distance from the central axis of the test rig injector. The test rig included only a multi-point injector like multi-point injector 100, without a centerline spray circuit. The test rig targeted a flow rate of 100 pph at 100 psi, using Mil-PRF-7024 Type 2 calibration fluid. This is a flow range in which it is difficult to obtain small droplets sizes for simplex pressure atomizers. The test rig included ten orifices equally spaced around a 1.5 inch diameter multi-point injector ring. The flow rate used for the data in FIG. 17 was 50 psig.

At a distance of 0.5 inches (1.27 cm) downstream of the outlets, the spray pattern is characterized by two annular peaks (the symmetry across the center axis causes the four peaks shown in the plot). This profile is indicated by square data points in FIG. 17. The outermost annular peak corresponds to the droplets on the radially outer boundary of spray cone 128 of outlet 16 (see FIG. 16). The innermost annular peak corresponds to the droplets on the radially inward boundary of the spray cone 128. At this axial location, there is virtually no spray volume on the centerline (i.e. at a radial distance of zero on the horizontal axis).

At a distance of 1.0 inches (2.54 cm) downstream of the outlets, the two annular peaks are largely coalesced into a single annular peak and a small amount of spray is present along the centerline. Thus, at 1.0 inches downstream, the sprays from diametrically opposed orifices (e.g. outlets 16) interact. This data is indicated by triangular points in FIG. 17.

At a distance of 2.0 inches (5.08 cm) downstream of the outlets, the spray is fully developed and there is a single conical peak of volume flux on the centerline, tapering down toward the periphery. At this location, the spray from diametrically opposed orifices is constructively combined to form the central peak. This data is indicated by diamond points in FIG. 17. Swirl strength deteriorates rather quickly as fluid leaves the orifices. Downstream the axial velocity is more prominent and swirl is less important.

Figure 18:
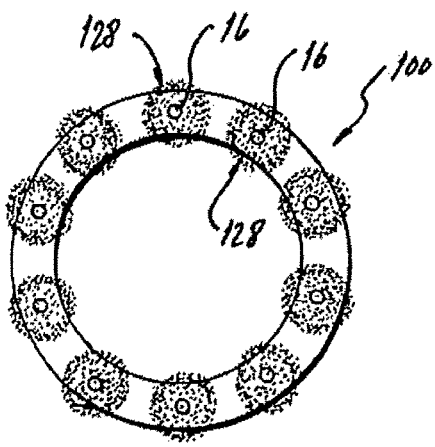
FIG. 18 is a schematic representation of the spray pattern from the multi-point injector of FIG. 17, showing the spray pattern at a distance of about 0.5 inches downstream from the spray orifices.
Figure 19:
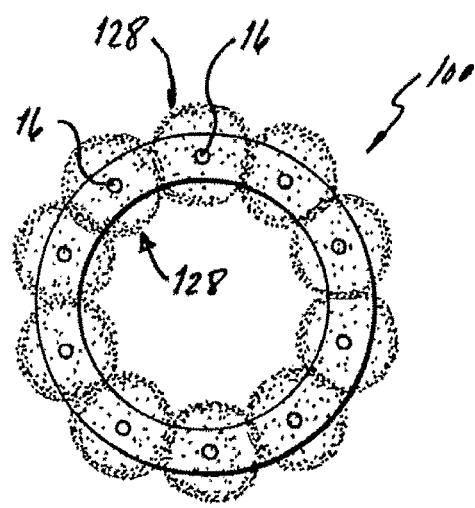
FIG. 19 is a schematic representation of the spray pattern from the multi-point injector of FIG. 17, showing the spray pattern at a distance of about 1.0 inch downstream from the spray orifices.
Figure 20:
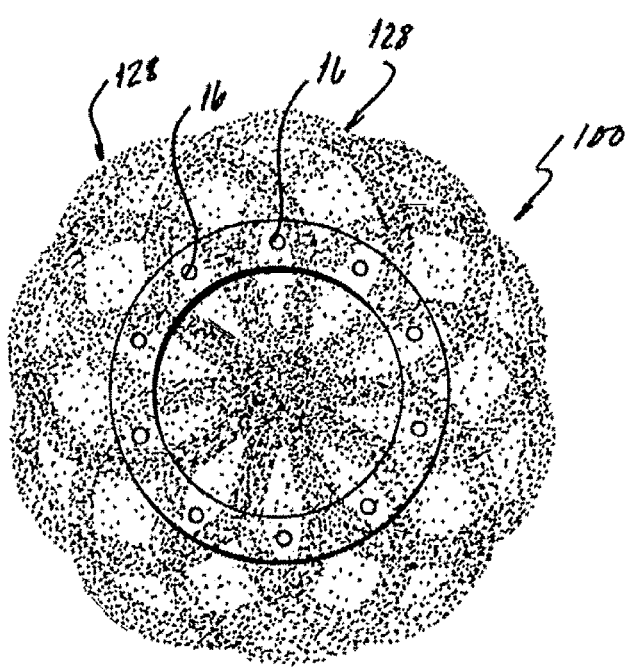
FIG. 20 is a schematic representation of the spray pattern from the multi-point injector of FIG. 17, showing the spray pattern at a distance of about 2.0 inches downstream from the spray orifices.

FIGS. 18-19 schematically show three radial patternator plots at the three downstream distances shown in the Volume Flux versus Radial Distance plot of FIG. 17, where sparse stippling indicates low volume flux and dense stippling indicates high volume flux. FIG. 18 schematically shows the spray pattern from the ten outlets 16 at a downstream distance of 0.5 inches, as indicated by the square data points in FIG. 17. FIG. 19 schematically shows the spray pattern from the ten outlets 16 at a downstream distance of 1.0 inch, as indicated by the triangle data points in FIG. 17. FIG. 20 schematically shows the spray pattern from the ten outlets 16 at a downstream distance of 2.0 inches, as indicated by the diamond data points in FIG. 17. The three radial patternator plots indicate that the individual spray cones blend into a well distributed spray downstream of the discrete outlet orifices.

Droplet sizes produced by the multi-point injector test were compared with those produced by an off-the-shelf oil burner simplex nozzle. A 16 GPH size was selected because the flow rate was identical to the multi-point injector. Though an oil burner nozzle is relatively inexpensive, the number of components is actually more than that of the multi-point injector, being made of a threaded body, orifice disc, slotted distributor, and screw pin. The oil burner simplex nozzle used was Delavan PN 16.0GPH, 90° Type B, from Delavan Spray Technologies, Bamberg S.C. Sauter Mean Diameter (SMD) droplet sizes at various flow conditions are shown in the table of FIG. 28. The multi-point injector shows a 25%-40% reduction in droplet size compared to the oil burner nozzle at the test conditions.

Since the overall fluid flow is divided into small streams in multi-point injectors, fluid metering passages become smaller, raising the concern of plugging in smaller sized applications. In the test rig described above, the minimum passage size was 0.015 inches (0.38 mm), which is generally deemed acceptable. For applications which required lower flow rates, the number of injection points can be reduced. An additional option is to utilize a single inlet swirl passage, where spin is induced in the fluid by one larger passage rather than through two smaller tangential slots.

Referring to FIGS. 21-23, there is shown another exemplary embodiment of a multi-point injector 300. Much like multi-point injector 100 described above, multi-point injector 300 includes a distributor ring 314 joined to an orifice ring 316, as indicated in the exploded view of FIG. 21. As shown in FIG. 22, a portion of an annular, eccentric flow passage 304 is defined in distributor ring 314. The full flow passage 304 is formed between distributor ring 314 and orifice ring 316 when they are joined together. Flow passage 304 also includes a non-eccentric portion 303, which allows flow to enter feed ports 320 without obstruction. FIG. 23 indicates the alignment of the internal features of rings 314 and 316. Distributor ring 314 includes a single backing surface 322, which is shown partially cut-away to reveal the underlying portion of flow passage 304 in FIG. 23.

Swirl chambers 308 defined in orifice ring 316 are fed by feed ports 320. Each swirl chamber 308 has a single feed port 320 that forms a spiral path toward the respective swirl chamber 308. While each swirl chamber is backed by backing surface 322, feed ports 320 are in fluid communication with flow passage 304. Thus fluid can pass from flow passage 304 into feed ports 320 and on to be swirled as it enters swirl chamber 308 and exits the respective outlet. Swirl chambers 308 and feed ports 320 can all be configured to be co-rotational with one another, counter-rotational, or any other pattern suitable for a given application.

FIG. 23a illustrates an outlet cone 377 downstream of the metering orifice, which aids in controlling spray angle. This feature can be included in the other embodiments described herein as well. The additional material thickness of the front face normal to the exit orifices, required to incorporate outlet cones 377, allows the face's surface area to be reduced by extending the corner chamfers 387. A smaller face area can reduce the propensity for carbon to develop on the face.

In certain applications where small dimensions are required, it can be advantageous to use the single feed port configuration of multi-point injector 300 instead of the double tangential inlet slots 120 of multi-point injector 100 described above. Channeling the full flow to an outlet through a single feed port allows for the single feed port to be larger in cross-sectional area than either of the individual split tangential slots would be at the same scale. Therefore, in small sized applications, an injector with single feed port 320 is less susceptible to blockages resulting from impurities in the fluid, etc.

With reference now to FIGS. 24-27, another exemplary embodiment of a multi-point injector 400 is shown. Much like multi-point injector 100 described above, multi-point injector 400 includes a distributor ring 414 joined to an orifice ring 416, as indicated in the exploded view of FIG. 24. As shown in FIG. 25, a portion of an inner annular flow passage 404 is defined in distributor ring 414 on a radially inwardly facing portion thereof, much like flow passage 304 describe above. The full inner flow passage 404 is formed between distributor ring 414 and orifice ring 416 when they are joined together. Unlike multi-point injector 300, multi-point injector 400 includes a second flow passage, namely outer flow passage 405. As shown in FIG. 25, a portion of outer annular flow passage 405 is defined in distributor ring 414 on a radially outwardly facing portion thereof. The full outer flow passage 405 is formed between distributor ring 414 and orifice ring 416 when they are joined together.

As indicated in FIGS. 25 and 26, flow passages 404 and 405 are eccentric, like flow passage 104 described above, in order to provide substantially uniform pressure to all of the spray outlets. This eccentricity is demonstrated by comparing thickness $t_1$ of the portions of flow passages 404 and 405 in FIG. 25 with the thickness $t_2$ thereof in FIG. 26. FIG. 26 is the cross-section at inlet 406 of distributor ring 114, where the thickness of passages 404 and 405 is greatest (designated $t_2$). FIG. 25 is the cross-section at a point opposite inlet 406, where the thickness of passages 404 and 405 is thinnest (designated $t_1$).

Referring to FIG. 27, there is shown the alignment of the internal features of rings 414 and 416. Distributor ring 414 includes a single backing surface 422, which is located between flow passages 404 and 405. Backing surface 422 backs swirl chamber 408, but tangential inlet slots 420 extend beyond backing surface 422, one to reach inner flow passage 404 and the other to reach outer flow passage 405. In other words, tangential inlet slots 420 straddle backing surface 422 to provide fluid communication between both flow passages 404 and 405 to the outlet in each swirl chamber 408. Backing surface 422 and orifice ring 416 contact, similar to the backing surfaces and orifice rings in injectors 100 and 300, forcing fluid into swirl chambers 408. Construction of multi-point injector 400 is simplified over that of multi-point injector 100 because there is no need to machine delivery slots like horseshoe shaped delivery slots 124 in the distributor ring, so distributor ring 414 could be largely machined on a lathe, for example. Swirl chambers 408 can be configured for co-rotating or counter-rotating swirl as described above.

The exemplary embodiments described above divide bulk liquid flow into a plurality of smaller streams for atomization, and can operate as atomizers. Those skilled in the art will readily appreciate that while each of the exemplary embodiments described above provide only a single fluid inlet (e.g. 106) into the multi-point injector, at least one additional fluid inlet can be defined in the annular body in fluid communication with the flow passage(s). Also, while each of the exemplary embodiments of multi-point injectors above have been shown and described as having ten outlets (e.g. outlets 16), any suitable number of outlets, including as few as two or three, can be used without departing from the spirit and scope of the invention.

The methods and systems of the present invention, as described above and shown in the drawings, provide for multi-point injection with superior properties including low part count, physical space requirements, and simplicity of geometry and of construction. Moreover, these advantages are attained while providing effective atomization and flow patternation, improved balance of flow rates across outlets, simplified heat shielding capabilities and thermal management, and reduced plugging and carbon build up.

While the apparatus and methods of the subject invention have been shown and described with reference to preferred embodiments, those skilled in the art will readily appreciate that changes and/or modifications may be made thereto without departing from the spirit and scope of the invention.

What is claimed is:
1. A multi-point injector comprising:
an annular body defining an interior annular flow passage, the annular body including a fluid inlet and a plurality of circumferentially spaced apart fluid outlets in fluid communication with the interior flow passage, wherein each of the outlets includes a swirl chamber defined in an upstream surface of the annular body in fluid communication with the annular flow passage for imparting swirl to fluid delivered thereto, and wherein each of the outlets includes an outlet orifice in fluid communication with a respective one of the swirl chambers, each outlet orifice being defined in a downstream surface of the annular body.

2. A multi-point injector as recited in claim 1, wherein the annular body includes a distributor ring with the fluid inlet of the annular body defined therein, and wherein the annular body includes an orifice ring connected to the distributor ring with the outlets of the annular body defined therein, and wherein the interior flow passage is defined between the distributor ring and the orifice ring.

3. A multi-point injector as recited in claim 2, wherein each swirl chamber of the annular body is defined in the orifice ring about one of the outlet orifices.

4. A multi-point injector as recited in claim 3, wherein each swirl chamber includes a tangential inlet slot configured to convey fluid from the interior flow passage to the swirl chamber.

5. A multi-point injector as recited in claim 4, further comprising a swirl chamber slot backing surface defined on the distributor ring and adjacent each swirl chamber.

6. A multi-point injector as recited in claim 5, further comprising a plurality of fluid delivery slots defined in the swirl chamber slot backing surface to provide passage for fluids from the interior flow passage into the tangential inlet slots of the swirl chambers.

7. A multi-point injector as recited in claim 2, further comprising:
   a) two tangential inlets in fluid communication with each swirl chamber configured to convey fluid from the interior flow passage to the swirl chamber in a common swirl direction, wherein one swirl chamber and two respective tangential inlets are defined in the orifice ring about each outlet orifice for imparting swirl to fluids exiting the outlet orifice;
   b) a swirl chamber slot backing surface defined on the distributor ring and adjacent each swirl chamber; and
   c) a plurality of fluid delivery slots defined in the swirl chamber slot backing surface to provide passage for fluids from the interior flow passage into the tangential inlet slots of the swirl chambers.

8. A multi-point injector as recited in claim 7, wherein the swirl chambers and tangential inlets are configured to impart co-rotating swirl to flow from the outlet orifices.

9. A multi-point injector as recited in claim 7, wherein the swirl chambers and tangential inlets are configured to impart counter-rotating swirl to flow from the outlet orifices.

10. A multi-point injector as recited in claim 1, wherein the interior flow passage is eccentric with respect to a central axis of the annular body to provide a substantially uniform fluid pressure to each of the outlets.

11. A multi-point injector as recited in claim 1, further comprising an inlet tube operably connected to the fluid inlet of the annular body for supplying fluid to the interior flow passage.

12. A multi-point injector as recited in claim 1, further comprising at least one second fluid inlet defined in the annular body in fluid communication with the flow passage.

13. A multi-point injector as recited in claim 1, wherein each swirl chamber is a spiral shaped swirl chamber.

14. A multi-point injector comprising:
   a) a distributor ring defining a central axis and having a fluid inlet;
   b) an orifice ring connected to the distributor ring, the orifice ring defining a plurality of outlets circumferentially spaced apart with respect to the axis, wherein each of the outlets includes a swirl chamber defined in an upstream surface of the orifice ring for imparting swirl to fluid delivered thereto, and wherein each of the outlets includes an outlet orifice in fluid communication with a respective one of the swirl chambers, each outlet orifice being defined in a downstream surface of the orifice ring;
   c) an outer annular flow passage defined between the distributor ring and the orifice ring around the axis, the outer flow passage configured to provide for fluid communication between the fluid inlet and the outlets for supplying fluid to be sprayed from the outlet orifices; and
   d) an inner annular flow passage defined between the distributor ring and the orifice ring around the axis inboard of the outer flow passage, the inner flow passage configured to provide fluid communication between the fluid inlet and the outlets for supplying fluid to be sprayed from the outlet orifices.

15. A multi-point injector as recited in claim 14, wherein a portion of the outer flow passage is defined in the distributor ring and is eccentric with respect to the axis, and wherein a portion of the inner flow passage is defined in the distributor ring and is eccentric with respect to the axis.

16. A multi-point injector as recited in claim 14, wherein one swirl chamber is defined about each outlet orifice for imparting swirl to fluids exiting the outlet orifice, wherein each of the swirl chambers includes an outer tangential inlet slot configured to convey fluid from the outer flow passage to the swirl chamber, and wherein each of the swirl chambers includes an inner tangential slot configured to convey fluid from the inner flow passage to the swirl chamber.

17. A multi-point injector as recited in claim 14, further comprising an inlet tube operably connected to the fluid inlet of the distributor ring for supplying fluid to the flow passages.

18. An injector comprising:
   a) a nozzle body defining a central axis;
   b) a distributor ring within the nozzle body disposed around the axis thereof and having a fluid inlet;
   c) an orifice ring connected to the distributor ring, the orifice ring having a plurality of outlets circumferentially spaced apart with respect to the axis, wherein an interior annular flow passage is defined between the distributor ring and the orifice ring, the flow passage defining a portion of a first spray circuit and being configured to provide fluid communication between the fluid inlet and the outlets for supplying fluid to be sprayed from the outlets, wherein each of the outlets includes a swirl chamber defined in an upstream surface of the orifice ring for imparting swirl to fluid delivered thereto, and wherein each of the outlets includes an outlet orifice in fluid communication with a respective one of the swirl chambers, each outlet orifice being defined in a downstream surface of the orifice ring; and
   d) a heat shield operably connected to the nozzle body and configured to thermally isolate fluids in the flow passage.

19. An injector as recited in claim 18, wherein a portion of the flow passage is defined in the distributor ring and is eccentric with respect to the axis of the nozzle body to provide a substantially uniform pressure to all of the outlets.

20. An injector as recited in claim 18, further comprising second spray circuit including an outlet inboard of the outlets of the orifice ring.

* * * * *